Oct. 31, 1933.  J. R. BROWN  1,932,767
HIGH PRESSURE LIQUID LEVEL GAUGE
Filed Jan. 19, 1931
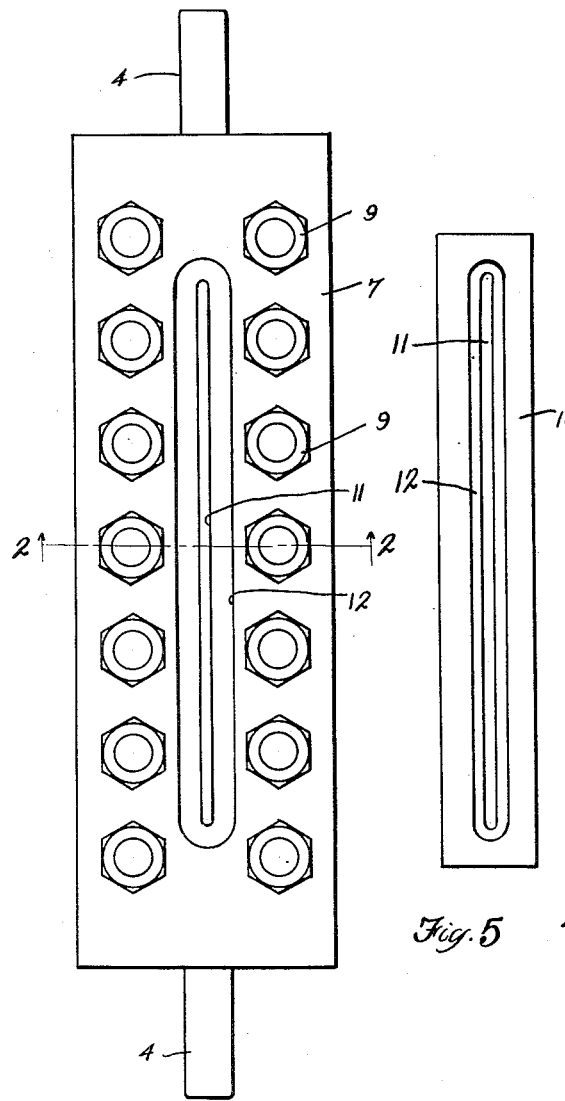
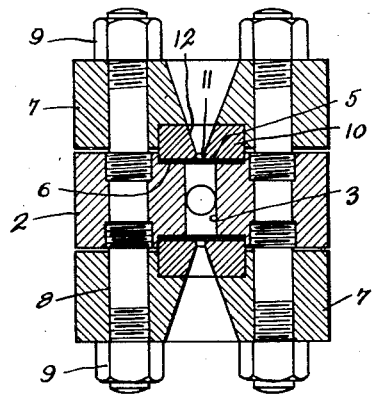
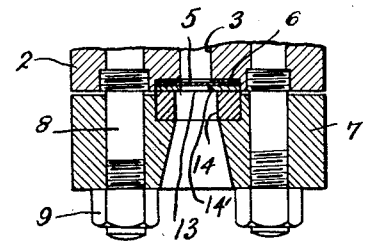
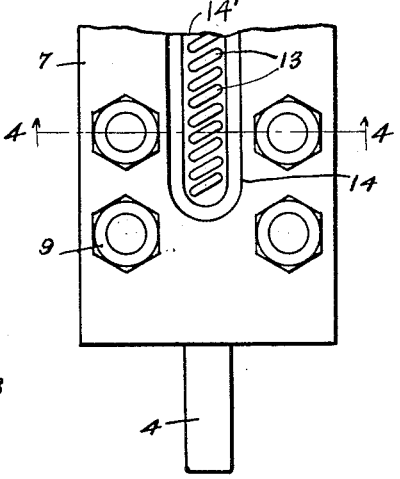
INVENTOR.
John Rowland Brown
BY
Fay Oberlin & Fay
ATTORNEY.S.

Patented Oct. 31, 1933

1,932,767

UNITED STATES PATENT OFFICE

1,932,767

HIGH PRESSURE LIQUID LEVEL GAUGE

John Rowland Brown, Cleveland, Ohio, assignor to The Reliance Gauge Column Company, Cleveland, Ohio, a corporation of Ohio Application January 19, 1931. Serial No. 509,585

4 Claims. (Cl. 73—54)

In liquid level gauges for high pressure usage, it has been found that glass is subject to corrosive attack at high temperature in the presence of even such an agent as steam, and the practice has arisen of interposing a mica sheet between the glass and the fluid chamber, such as to allow visibility and yet avoid direct contact on the glass. Even with this, however, the use of glass is unsatisfactory in many instances, it being subject to breakage from temperature changes and mechanical shocks. In accordance with the present invention, however, a construction may be had such as to eliminate difficulties from the inclusion of such a highly frangible element in an assemblage, and allow of usage with even greater pressures than heretofore customary.

To the accomplishment of the foregoing and related ends the invention, then, comprises the features hereinafter fully described, and particularly pointed out in the claims, the following description and the annexed drawing setting forth in detail certain embodiments of the invention, these being illustrative, however, of but a few of the various ways in which the principle of the invention may be employed.

In said annexed drawing:

Fig. 1 is a front elevational view showing an embodiment of the invention; Fig. 2 is a transverse section thereof taken on a plane substantially indicated by the line 2—2, Fig. 1; Fig. 3 is a fragmentary elevational view of a modification; Fig. 4 is a fragmentary transverse section thereof taken on a plane substantially indicated by the line 4—4, Fig. 3; and Fig. 5 is an elevational view of a detail.

As shown in the drawing, the construction includes a body member 2, having a liquid-indicating chamber 3 therein, preferably in the form of a slot, and connectible by any suitable connections 4 to a liquid-holding receptacle, for instance a steam boiler. Arranged as a cover over such chamber or slot 3 is a thin transparent non-corroding member 5. This may be a suitably resistant silicate, natural or artificial, preferably one of the forms of mica. As a tightening packing, a gasket 6 may be interposed between the transparent member and the support or body 2. A holding or clamping member 7 is arranged to co-operate with the body member 2, being held therewith by suitable means for binding the assemblage together, for instance screw-threaded members which may be in the form of through-and-through bolts, or for instance, studs 8, with which nuts 9 may co-act.

Bearing upon the transparent sight member 5 is a metallic backing member; preferably it is in the form of a separate metal piece 10, perforate to allow visibility through the transparent cover 5. Ordinarily, such member 10 may be slotted as at 11, to align in general with the fluid chamber 3, and preferably the opening is beveled or tapered as at 12, and the base of the slot in any event is desirably narrower than the chamber 3.

In some instances, the perforation of the member 10 may take the form of spaced holes 13, in general alignment with the liquid chamber 3, thereby allowing visibility through the transparent cover. If preferred, with such form also the metal may be in two pieces, an inner perforated plate 14' having the series of holes 13, and an outer thicker plate 14 having a longitudinal slot over-lying the holes aforesaid (see Figs. 3 and 4).

The backing member 10 or the like may thus be clamped between the transparent cover 5 and the clamping member 7, such as to make a secure engagement of the assemblage, and afford visibility, while at the same time amply backing up the thin transparent cover plate. While in some instances where the contrast is sufficient as regards color, one such perforate backing member and transparent cover may be employed, the fluid chamber being suitably closed oppositely. Ordinarily, though, corresponding sets of transparent plates and metal backing members are applied at each side, thereby allowing passage of light through and thus providing adequate visibility for the meniscus line of colorless liquids.

It is seen that the visibility-member or plate 10 affords an improved substitute for a glass plate in relation with a liquid-gauge, and, unlike a glass plate it is not breakable from temperature changes or mechanical shocks, and it can be held in place by clamping pressure applied directly to it.

Other modes of applying the principle of the invention may be employed, change being made as regards the details described, provided the means stated in any of the following claims, or the equivalent of such, be employed.

I therefore particularly point out and distinctly claim as my invention:

1. A liquid-level gauge, comprising a liquid-level indicating chamber, a thin non-corroding transparent cover, a metallic backing means therefor in two parts, one being an inner plate perforated with a series of holes and the other an outer member perforated where over-lying said series of holes, a clamping plate on said backing means, and securing means therefor.

2. A liquid-level gauge, comprising a body member having a longitudinal slot, a thin non-corroding transparent cover, a metallic backing means therefor in two parts, one being an inner plate perforated with a series of holes and the other an outer member perforated with a slot over-lying such series of holes, a clamping plate on said backing means, and securing means therefor.

3. A liquid-level gauge for high-pressure use, comprising a body-member having a sight-slot through from front to back, a recess about the slot on the front and back faces of the body-member, a thin flexible transparent cover in each such recess, a clamping plate for each such cover perforate opposite the slot of the body-member and having a recess corresponding to that of the body-member, screw-threaded means for securing the clamping plates to the body-member, and perforate metallic backing means for each flexible transparent cover in the recess between the body-member and clamping plate.

4. A liquid-level gauge for high-pressure use, comprising a body-member having a sight-slot through from front to back, a recess about the slot on the front and back faces of the body-member, a thin flexible transparent cover in each such recess, a clamping plate for each such cover perforate opposite the slot of the body-member and having a recess corresponding to that of the body-member, screw-threaded means for securing the clamping plates to the body member, a perforate thin metal plate over-lying each said flexible transparent cover, and a thicker metal plate filling the recess over each such thin plate between the body-member and clamping plate.

JOHN ROWLAND BROWN.